United States Patent [11] 3,632,884

[72] Inventors Hiroshi Inose; Tadao Saito, both of Tokyo, Japan
[21] Appl. No. 849,634
[22] Filed Aug. 13, 1969
[45] Patented Jan. 4, 1972
[73] Assignee Bell Telephone Laboratories, Incorporated Murray Hill, N.J.
[32] Priorities Sept. 12, 1968
[33] Japan
[31] 43/65224; Sept. 12, 1968, Japan, No. 43/65225; Sept. 12, 1968, Japan, No. 43/65226

[54] TIME DIVISION COMMUNICATION SYSTEM
14 Claims, 16 Drawing Figs.

[52] U.S. Cl. .......... 179/15 AQ
[51] Int. Cl. .......... H04j 3/16
[50] Field of Search .......... 179/15 AQ

[56] References Cited

UNITED STATES PATENTS

| | | | |
|---|---|---|---|
| 3,172,956 | 3/1965 | Inose | 179/15 AQ |
| 3,446,917 | 5/1969 | Inose | 179/15 AQ |

FOREIGN PATENTS

| | | | |
|---|---|---|---|
| 41-6,376 | 4/1966 | Japan | 179/15 AQ |

*Primary Examiner*—Ralph D. Blakeslee
*Attorneys*—R. J. Guenther and James Warren Falk

ABSTRACT: A time division communication system is disclosed in which the multiplexed content of a plurality of transmission highways is further interleaved on a superhighway and in which pulse shifting devices in a switching center transpose information among the transmission highways in order to obviate blocking in the transfer of information between superhighways.

INVENTORS H. INOSE
T. SAITO
BY
R. C. Winter
ATTORNEY

TIME DIVISION COMMUNICATION SYSTEM

BACKGROUND OF THE INVENTION

Telephone systems have been developed which operate on a time separation basis in which a number of conversations share a single transmission path or highway. Privacy of conversations is insured in such systems by separation of individual conversations in time. Thus, each call is assigned to the common highway for an extremely short but rapidly and periodically recurring interval, and the connection between any two lines in communication is completed only during these short intervals, termed time channels. Samples which retain essential characteristics of the voice or other signal are transmitted over the common highway in these time channels and are utilized in the called line to reconstruct the original signal so that the reception of signals of any complexity through the time division network is entirely satisfactory.

A further refinement introduced into such time multiplex communication systems is the coding of each speech sample, typically by pulse code modulation (PCM). The speech signal is first sampled at a sampling rate which is at least twice the bandwidth of the signal to be transmitted. Thus if the transmission bandwidth is 4 kilohertz, the sampling rate for each line active on a call connection is 8 kilohertz. The resultant sample is then quantized into, for example, 128 levels, each of which is assigned a discrete code of 7 or 8 binary digits termed bits.

In a typical prior art system as disclosed, for example, in D. B. James et al., U.S. Pat. No. 2,957,949, each common highway accommodates 24 channels, i.e., 24 simultaneous conversations. Thus, with a sampling rate of 8 kilohertz, each time channel with have a duration of 5.2 microseconds and will recur at 125 microsecond intervals termed a frame. It is assumed that eight bits are transmitted over the common highway in each 5.2 microsecond time channel. The time channel assigned to each speech signal is recognized at each switching point according to its sequential position in the frame which, in turn, is defined by a bit appearing at the beginning of each frame interval. Thus in the prior art system, a frame of 125 microseconds comprises eight bits per channel $\times$ 24 channels + one framing bit = 193 bits per frame, and the resultant bit rate is 193$\times$8 kilohertz or 1.544 megahertz on a 24-channel transmission highway.

It is necessary that such a time division system identify and remember which lines have been assigned to which time channels in the recurring cycle so that active lines will always be sampled at the proper time. Such operations will always be sampled at the proper time. Such operations may be synchronous in which case the same time channel is assigned to the calling and called lines. The aforementioned James et al., patent describes such a synchronous operation. This type of operation is entirely satisfactory from a traffic standpoint in systems which include a single control facility common to all subscriber lines. However, a blocking problem is introduced when the system is expanded to include geographically remote groups of subscriber lines for which switching and control facilities are provided at distinct central offices.

To illustrate this blocking problem, consider that a telephone subscriber associated with a first central office places a call to a subscriber associated with a second central office. A specific number of time channels are available in each office for assignment to telephone connections in accordance with the particular traffic requirements. In a synchronous operation, as indicated, a connection is completed only when the same time channel is available in both of the concentrators concerned. Consider, for example, that the first time channel in the frame, designated Time Channel 1, is idle in the first office. Thus it may be assigned to the scaling line. However, in attempting to complete a connection through the second office to the called line, it is found that time Channel 1 in that office is being utilized on another call. Thus, the instant connection is blocked from utilizing Time Channel 1 and a delay is encountered while a common idle time channel is being determined.

This problem is further aggravated as additional switching stages through which the connection must be established are added to the system. In this instance, the chances of any one time channel being idle simultaneously in the originating and terminating offices as well as in the intermediate switching stages are slight, and the possibility that complete blocking and loss of the call will occur is increased.

A solution to this blocking problem is provided by the arrangement described in h. Inose et al., U.S. Pat. No. 3,172,956, issued Mar. 9, 1965. A device is provided which delays information provided in the time channel assigned to the calling line for transmission to the called line in a different time channel. Thus, if a common time channel is not available the call is not lost, but rather, a different time channel which is idle in the office terminating the called line is assigned to the called line, and information is transferred between the two time channels prior to transmission to the respective parties. Such an arrangement is termed time channel interchange, and its use in accordance with the aforementioned Inose et al., patent assures a substantial reduction in the probability that blocking will occur.

The channel interchange solution to the blocking problem provided by Inose et al., is satisfactory for systems of the type disclosed by James et al., in which a central office serves several remote line concentrators via individual highways, each having a 24-channel capacity. However, in linking several central offices, this approach would require a large number of interoffice highways and complex terminal equipment which, of course, may prove uneconomical.

SUMMARY OF THE INVENTION

In accordance with our invention the content of a plurality of 24-channel highways is interleaved. A transmission system is provided with a higher repetition rate, i.e., *n* times higher than that utilized for one highway, and the signals carried by *n* highways then are transmitted over a single superhighway.

Advantageously, the superhighway multiplexing is accomplished by subdividing each bit interval into a plurality of time intervals, designated minibits. Each minibit represents one bit interval in one time channel on one highway. Thus, a system with four highways multiplexed on a superhighway would require four minibits in each bit interval on the superhighway, the sequence of minibits representing one bit from each of the four highways.

A single superhighway transmitting the interleaved information provided by *n* highways, of course, solves the economic problem relating to interoffice cable requirements. However, to unravel the highly multiplexed messages at each central office or switching center and to reroute them to their proper destinations presents an awesome control problem despite the availability of the Inose et al., channel interchange techniques. Thus, for example, if all of the coded messages carried by *n* highways are interleaved on a superhighway, channel interchange on the superhighway as described by Inose et al., would require pulse shifters and associated memories having a 193$\times n$ bit capacity. In accordance with our invention, however, a unique pulse shifting and switching operation is introduced at each juncture of superhighways which takes advantage of the minibit interleaving technique to permit an interchange between a channel in one highway and the same channel in any other one of the *n* highways appearing on a superhighway by utilizing pulse shifters with only an *n* bit capacity. The scheme recognizes that the minibits within a bit interval may be interchanged arbitrarily so long as an identical interchange is effected in each of the other bit intervals of a time channel. Thus an *n* interleaved highway system permits *n* different minibit arrangements, each of which results in a different one of *n* possible highway interchanges.

THE DRAWING

DETAILED DESCRIPTION

Figure 1A:
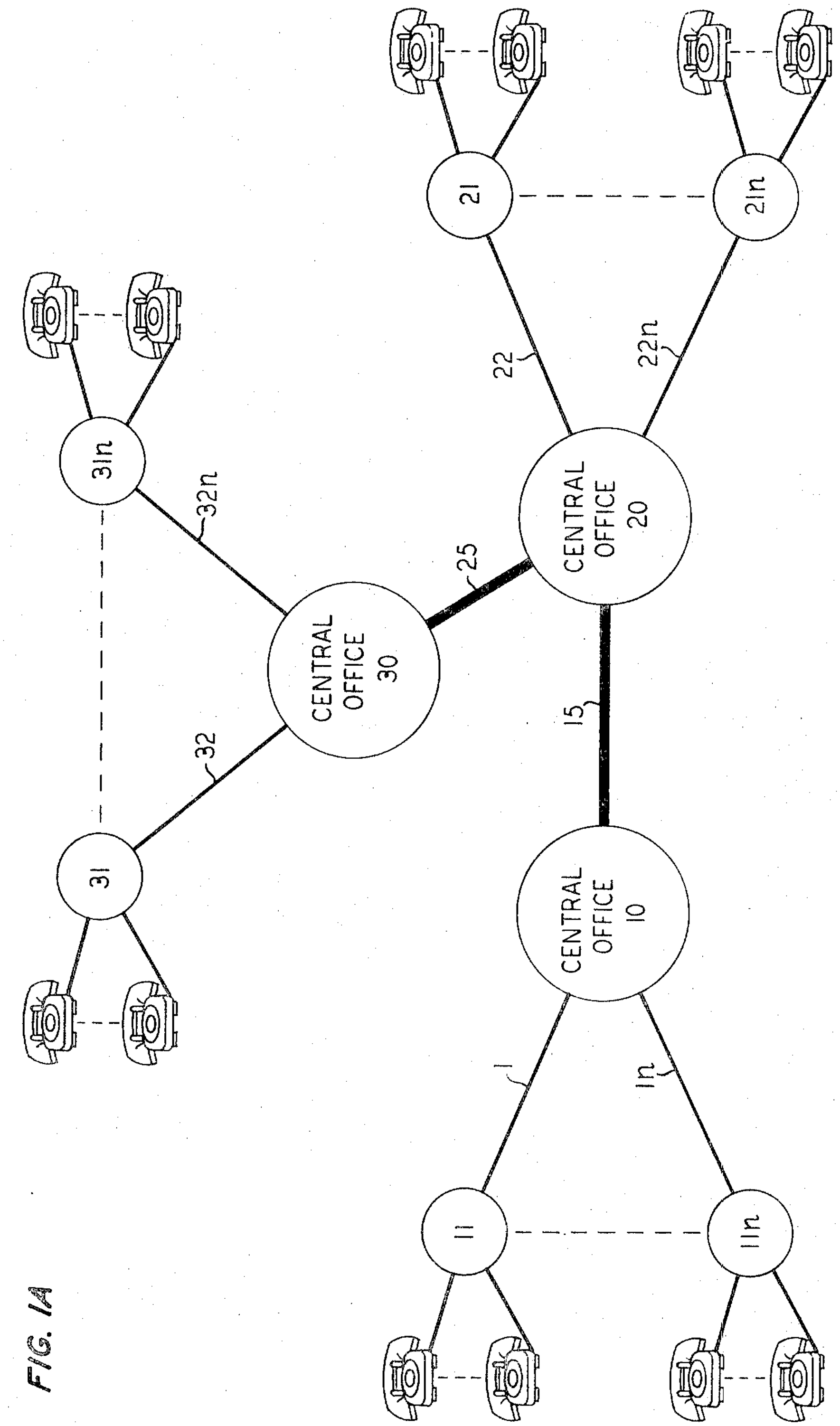
FIG. 1 depicts a PCM time division multiplex communication system embodying our invention.
FIG. 1B is a time chart illustrating the time channel assignment on a highway in the system depicted in FIG. 1A and the manner of interleaving time channels on a superhighway in that system in accordance with one aspect of our invention.

Turning now to FIG. 1A, a PCM time division multiplex communication system is illustrated which is of the type disclosed, for example, in D. B. James et al., Pat. No. 2,957,949, issued Oct. 25, 1960. As noted therein, three central offices or switching centers 10, 20 and 30 are interconnected by transmission facilities represented by single cables 15, and 25. Office 10 serves telephone lines terminated on a group of line concentrators 11–11*n* via time multiplex highways 1–1n. Similarly, offices 20 and 30 serve telephone lines terminated on groups of line concentrators 21–21*n* and 31–31*n* respectively via time multiplex highways 22–22*n* and 32–32*n* respectively. In James et al., the interoffice facilities may comprise conventional analog trunks or a group of time multiplex highways of the type utilized between each office and the line concentrators. In accordance with our invention these interoffice facilities are designated as superhighways 15 and 25 as described hereinafter.

Figures 1B, 3:
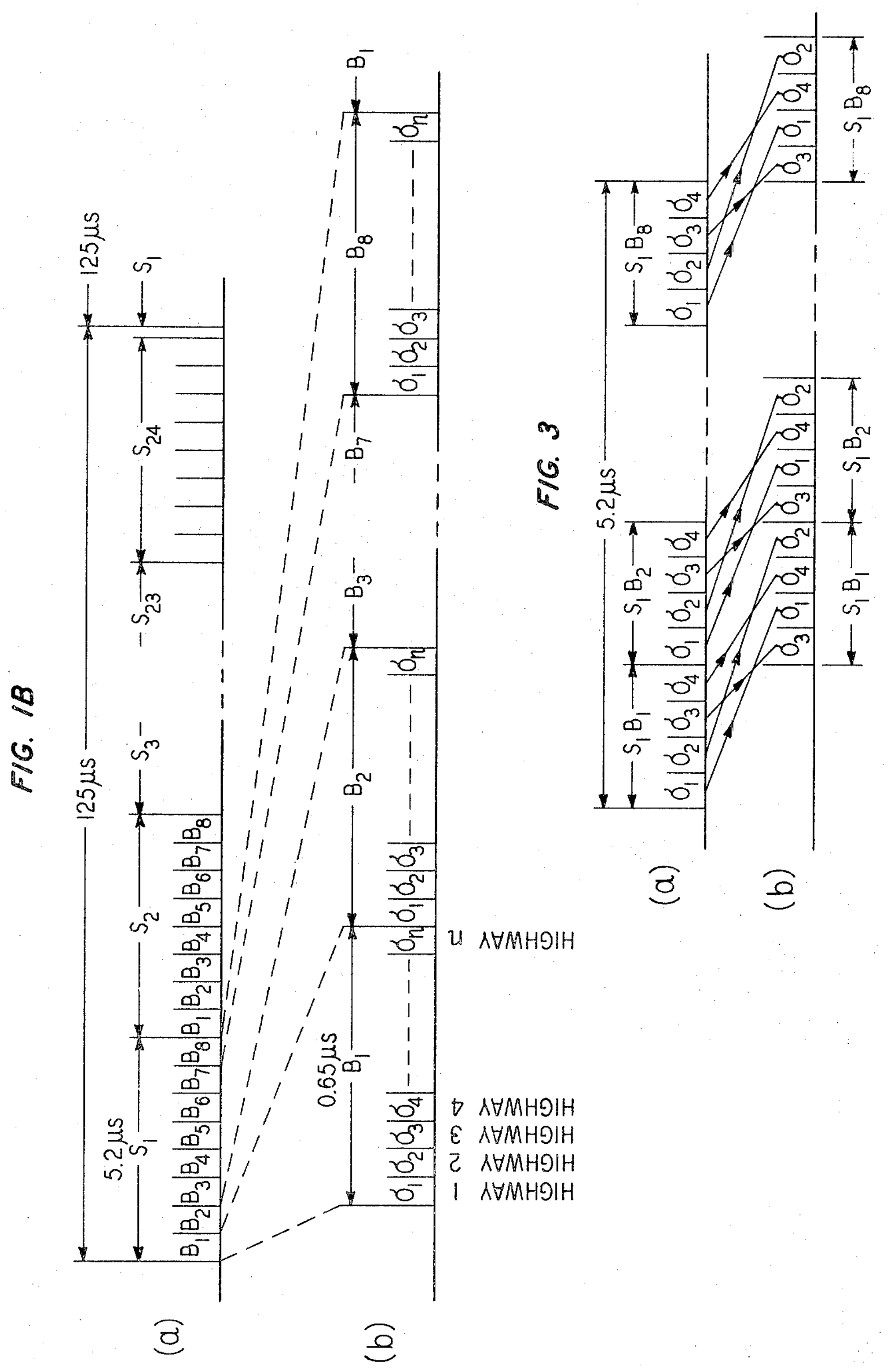
FIG. 3 illustrates the principle of time channel shifting or highway interchange in a system in accordance with another aspect of the invention.

FIG. 1B is a time chart illustrating in part (a) the time channel allocation on each of the highways 1–1*n*. The frame interval of 125 microseconds is divided into 193 bit intervals, B, each of which has a duration of approximately 0.65 microseconds. Each conversation is assigned to a particular one of the time channels $S_1$–$S_{24}$ and each time channel, in turn, is divided into eight bit intervals, $B_1$–$B_8$. Thus, the first eight bits of each frame are included in the first time channel $S_1$. Each succeeding time channel also comprises 8 bits. The last bit interval in each frame, $B_{193}$, which occurs between time channels $S_{24}$ and $S_1$, carries the synchronization information for the particular frame in which it appears. The first seven bits in each time channel, $B_1$–$B_7$, are assigned to speech signals in coded form while the final bit, $B_8$, is used to transmit the status of each signal source, such as a telephone subscriber.

FIG. 1B illustrates in part (b) the time channel allocation in one direction on a superhighway 15 or 25, FIG. 1A, in accordance with the illustrative embodiment of our invention. As noted in FIG. 1B, the content of *n* highways is multiplexed on the single superhighway. The duration of bit interval $B_1$ in time channel $S_1$ is further divided into *n* minibit intervals, $\sigma_1$, $\sigma_2$, ... $\sigma_n$. Each of these minibit intervals $\sigma_1$–$\sigma_n$ in $S_1B_1$ conveys the first bit of the first time channel as it appears on a corresponding one of the *n* highways terminating on an office, FIG. 1A. Similarly, each minibit $\sigma_1$–$\sigma_n$ in $S_1B_2$, conveys the information contained in the second bit interval of the first time channel on the respective highways 1–1*n*. Thus, the frame phase of each highway 1–1*n* is completely interleaved with a phase difference of less than one bit duration, and the phase of each highway is interleaved on the superhighway with a phase difference of 1/*n* of a bit interval.

Figure 2:
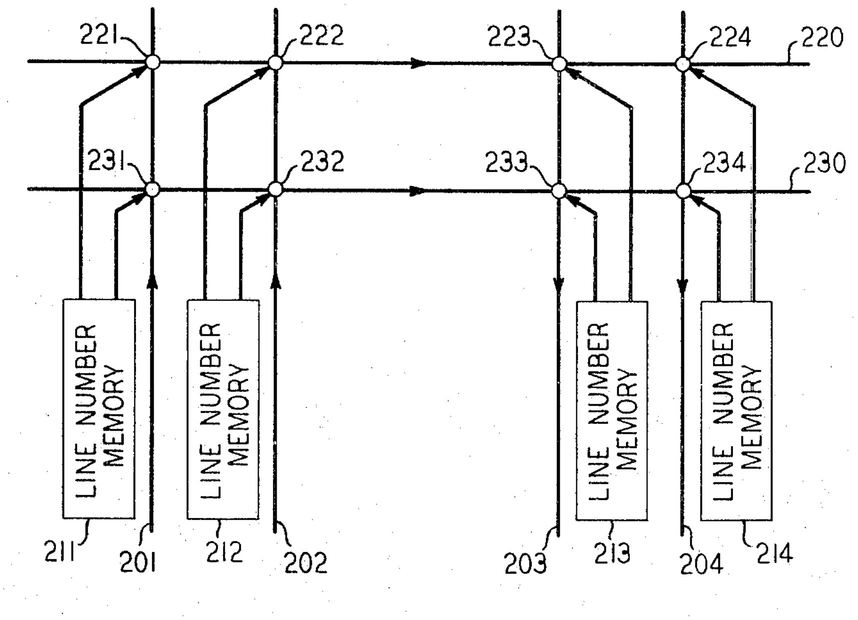
FIG. 2 is a block diagram of a switching network in accordance with one illustrative embodiment of the invention.

FIG. 2 further illustrates a time division switching system serving superhighways which utilize the interleaved highway technique. In this arrangement, incoming signals are received on incoming superhighways 201 and 202 and are switched to outgoing superhighways 203 and 204 via transit superhighways 220 and 230 termed junctors. Of course the various superhighways depicted in FIG. 2 are merely illustrative of those provided in a given system.

Switching between the superhighways and the junctors is accomplished via gates 221–224 and 231–234. Line number memories 211–214 control the gates at the cross-points to interconnect the incoming and outgoing superhighways via the junctors.

A typical call connection will illustrate this system operation. Thus it is assumed that information arriving in the portion of incoming superhighway 201 occupies a discrete position in each frame interval, i.e., $S_s$, $B_j$, $\sigma_k$. In order to apply information arriving in this frame position to outgoing superhighway 203 through junctor 220, gates 221 and 223 are enabled by line number memories 211 and 213 in $S_s$, $B_x$, $\sigma_k$. It should be evident, of course, that *x* in this instance designates each bit position 1–8 so that all of the minibits representing the same signal sample will be routed through the same path. Thus line number memories 211 and 213 will enable gates 221 and 223 eight times during each channel interval in order to convey this message through the network of FIG. 2. During other time channels these highways will carry other signal samples, and the gates will be enabled accordingly in order to interconnect the proper superhighways.

It frequently occurs that the time channel assigned to a calling station is occupied on another call connection in the junctor or outgoing superhighways. Thus, if junctor 220 was previously occupied during this time channel, another junctor, such as 230, may be utilized for the instant call. However, if the particular assigned minibit interval is not available on any of the junctors or on outgoing superhighway 203, the connection cannot be established through this network despite the fact that other minibit intervals are available to accommodate this call connection. Such a situation is termed network blocking. Inherently, the system depicted in FIG. 2 would produce a considerable amount of such blocking, thereby substantially degrading the efficiency of the network.

This blocking may be overcome through the employment of pulse shifters as disclosed, for example, in the aforementioned H. Inose et al., patent. With such pulse shifters, as indicated hereinbefore, each pulse of a coded signal sample is stored temporarily and released to the outgoing path at a later time interval. By employing pulse shifters, an incoming pulse transmitted in any arbitrary phase may be shifted to any other arbitrary phase thereby solving the internal blocking problem by permitting utilization of idle time positions in each stage of the network.

It should be apparent that pulse shifters require a considerable amount of memory to perform their function. For example, to shift all of the channels in a single highway, a 193 bit memory is required. A memory of this capacity, operating at a repetition rate of 1.5 megabits per second to interchange every channel between superhighways interleaving *n* highways, would require a memory device with a capacity of 193×*n* bits. With 24 channels in *n* highways, it is conceivable that a memory capacity sufficient to serve up to 144 highways would be required. Advantageously, however, in accordance with our invention such a large channel availability is not required. Instead, the manner of interleaving of highway channels, together with the unique manner of interchanging time channels at the junctors, permits a considerable reduction in the number of time channels required to provide the desired service.

As noted hereinbefore with respect to FIG. 1B part (b), the minibits are interleaved on the superhighway in a predetermined order and the subsequent transmission over the superhighway is performed in the same sequence. It may be seen, therefore, that by delaying all of the bits in a single time channel on a given highway by an interval corresponding to one minibit, the channel, in effect, is shifted to a channel position occupied by another highway. As noted in FIG. 3*a*, four highways are interleaved on a superhighway in the manner described with respect to FIG. 1B part (b). The minibits $\sigma_1$–$\sigma_4$ are arranged in consecutive order during transmission over the superhighway and before highway interchange is effected. In accordance with our invention the highway interchange, which may occur several times in each switching network, shows the pattern depicted in FIG. 3*b*. Thus the minibits are each delayed by a full bit interval. Advantageously the sequence of minibits need not be preserved during this highway interchange operation. In fact, the order of minibits after interchange is arbitrary so long as the same order after interchange is maintained of each bit interval. This, of course, is evident from the fact that successive minibits represent distinct messages transmitted over different highways. It is important to note that through this arbitrary minibit interchange in each delayed bit interval, four output channels are available, in this example, for assignment to any one of the input channels. Thus with such a random interchange of the order of minibits within one bit interval, *n* channels can be made available for time channel interchange in a system in which *n* highways are interleaved.

Figure 4:
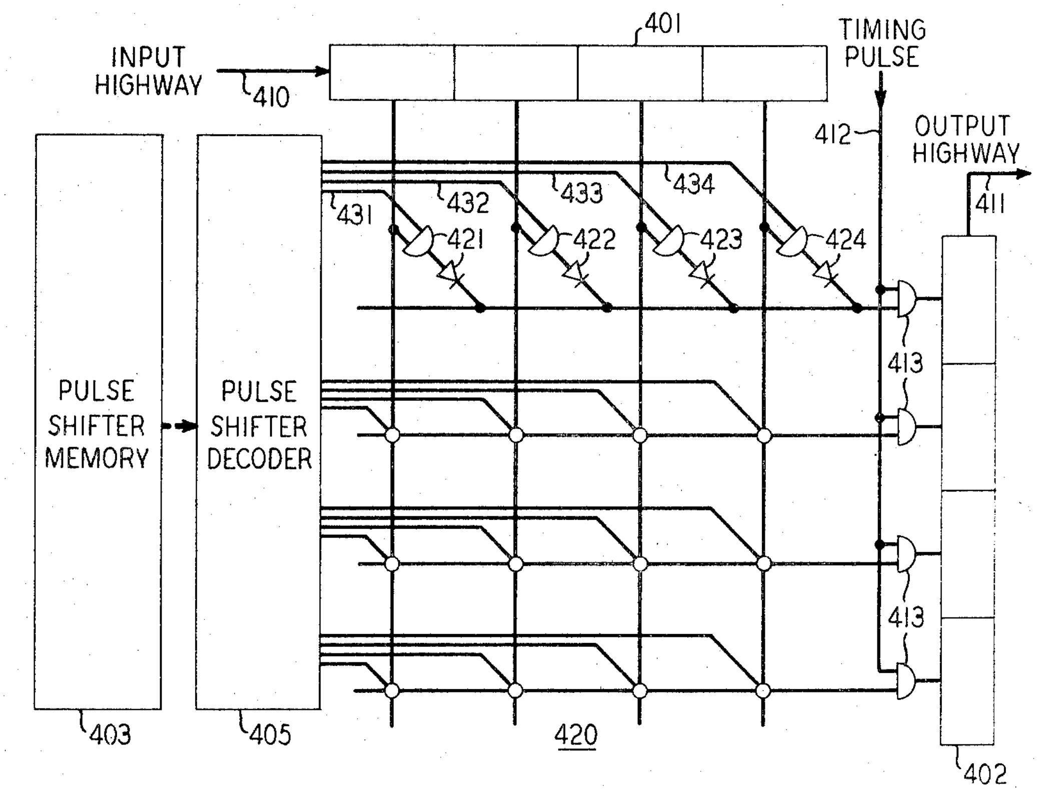
FIG. 4 depicts a pulse shifter for use in the switching network depicted in FIG. 2.

The type of pulse shifting mechanism required in order to realize the minibit interchange is illustrated in FIG. 4. This arrangement permits the order of minibits arriving on superhighway 410 to be interchanged arbitrarily for transmission over superhighway 411. The selected interchange order is stored in pulse shifter memory 403. Since this interchange order is altered in every 5.2 microsecond time channel, a new command is provided by memory 403 to pulse shifter decoder 405 at the outset of each successive time channel. Decoder 405 in turn enables one of the gates in gate group 420. In this instance 16 gates are included in gate group 420, of which four AND-gates 421-424 are illustrated, and the remaining 12 gates are shown symbolically by circles. Input superhighway 410 is terminated by input shift register 401, and output superhighway 411 receives information from output shift register 402. Each of these registers contains four stages, the output of each stage of the input shift register being connected to the input of each stage of the output shift register through the respective AND gates of gate group 420. For example, one input of register 402 is connected to the output AND-gates 421–424, to which the four successive stages of register 401 are connected respectively. The input to each stage of register 402 is provided with an AND-gate 413 so that each stage can be set or reset in accordance with the signal provided through gate group 420 coincident with the appearance of a time pulse on lead 412.

The four minibits in the example illustrated in FIG. 3 thus are stored in register 401, and the interchange command concerning these minibits is provided by memory 403 to decoder 405 for enablement of the appropriate AND gates in gate group 420. Thus in the example illustrated in FIG. 3, decoder 405 will enable AND-gate 422 via lead 432 to permit the minibit $\sigma_3$ contained in the third stage of register 401 to be shifted to the first stage of register 402. Upon occurrence of the next timing pulse on lead 412, the other minibit interchanges are effected by enablement of the appropriate AND gate in the other stages of gate group 420. The timing pulse is applied to lead 412 at the end of each bit interval in order to effect a minibit interchange after the storage in register 401 has been completed.

The identical interchange sequence is repeated during each bit interval of a single time channel. Thus with eight bits in a 5.2 microsecond time channel, the same minibit interchange will be effected by the pulse shifter of FIG. 4, on eight successive occasions. In the following time channel the interchange sequence may be altered to accommodate the next group of interleaved conversations.

In this example memory 403 must provide a two-bit command every 5.2 microseconds. The complexity of this command, of course, depends on the number of interleaved highways. Thus in a system in which $2_n$ highways are interleaved on each superhighway, memory 403 must provide *n* bits every 5.2 microseconds. A memory of such capacity is readily available in the art.

Figure 5:
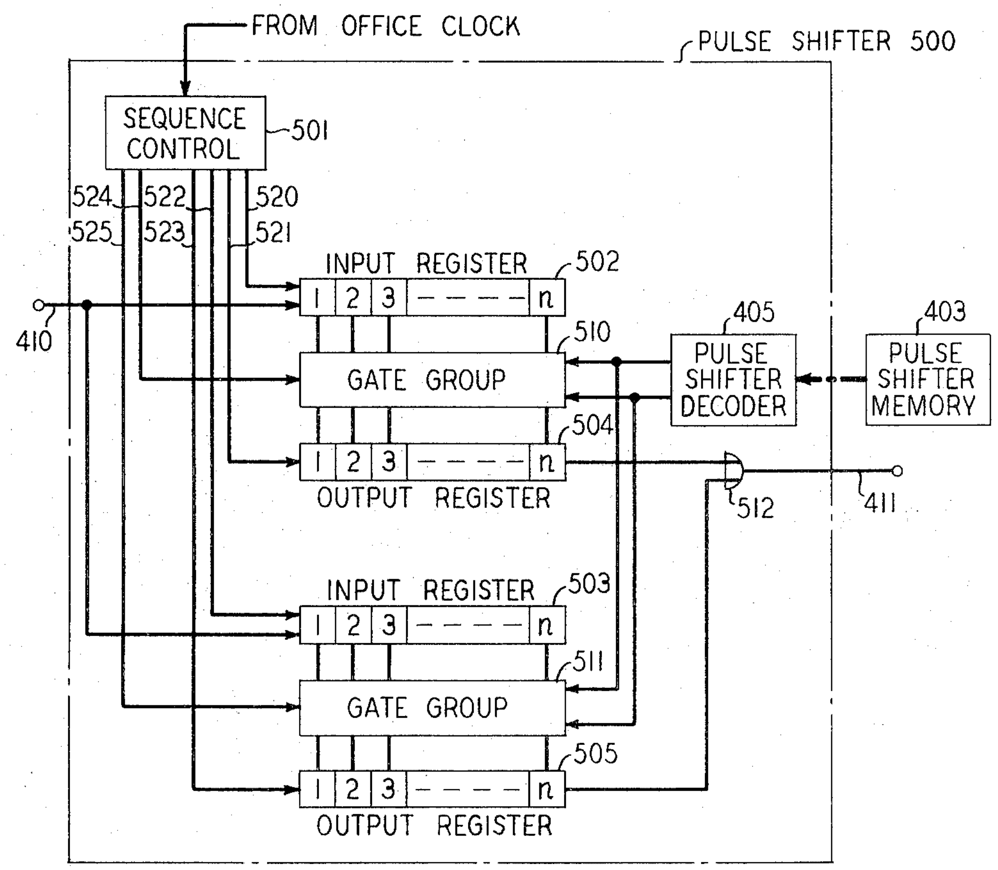
FIG. 5 depicts another form of pulse shifter which may be employed in the network of FIG. 2.

The pulse shifter illustrated in FIG. 4 delays the arriving four minibits by one bit interval and interchanges their order as prescribed by memory 403. The high speed of this operation indicates that the propagation delay occurring in gate group 420 would result in an overlap between the arriving and departing information. In order to avoid this occurrence, a pulse shifter of the type illustrated in FIG. 5 may be utilized. As noted therein, pulse shifter 500 comprises two input registers 502 and 503, two output registers 504 and 505, two gate groups 510 and 511, a sequence control 501, a pulse shifter decoder 405 and various other logic circuits. The basic operation corresponds to that depicted in FIG. 4. The number of interleaved highways in this instance is assumed to be *n*.

Figure 6:
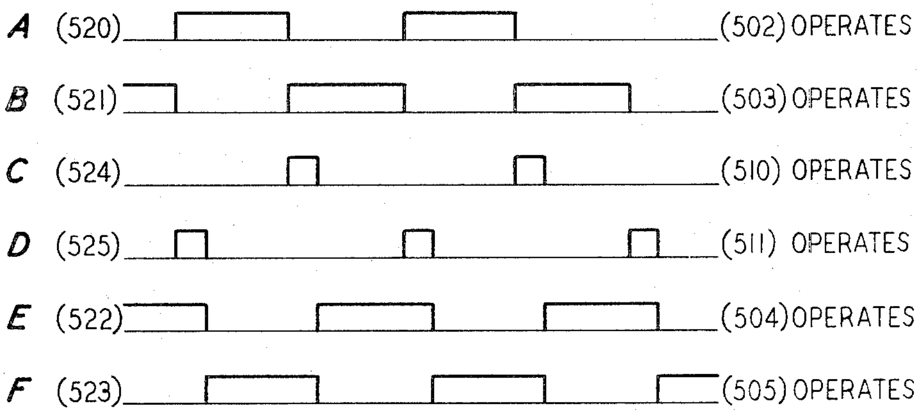
FIG. 6 is a time chart illustrating the operation of the pulse shifter depicted in FIG. 5.

The bit sequence of operations for pulse shifter 500 is indicated in the timing chart of FIG. 6. Thus input register 502 operates during one bit interval to store *n* minibits arriving on highway 410 under control of a signal on lead 520 from sequence control 501. In the next bit interval, sequence control 501 enables input register 503 via lead 522 and it then stores the *n* minibits arriving during the next bit interval. While register 503 is storing this sequence of *n* minibits, those minibits previously stored in register 502 are transferred to output register 504 via gate group 510. While this transfer is being effected, output register 505 is also operating to transfer its content to output highway 411 via OR-gate 512. Upon completion of this transmission from output register 505, the other output register, 504, which has just received a supply of minibits from input register 502, begins to transmit these minibits in sequence to output highway 411, and as this sequential transfer is being effected, input register 503 completes the storage of the next sequence of incoming minibits and transfers them to output register 505 via gate group 511. Thus it is seen that the pairs of registers operate alternately to avoid the overlap problem encountered in the arrangement depicted in FIG. 4.

Figure 7:
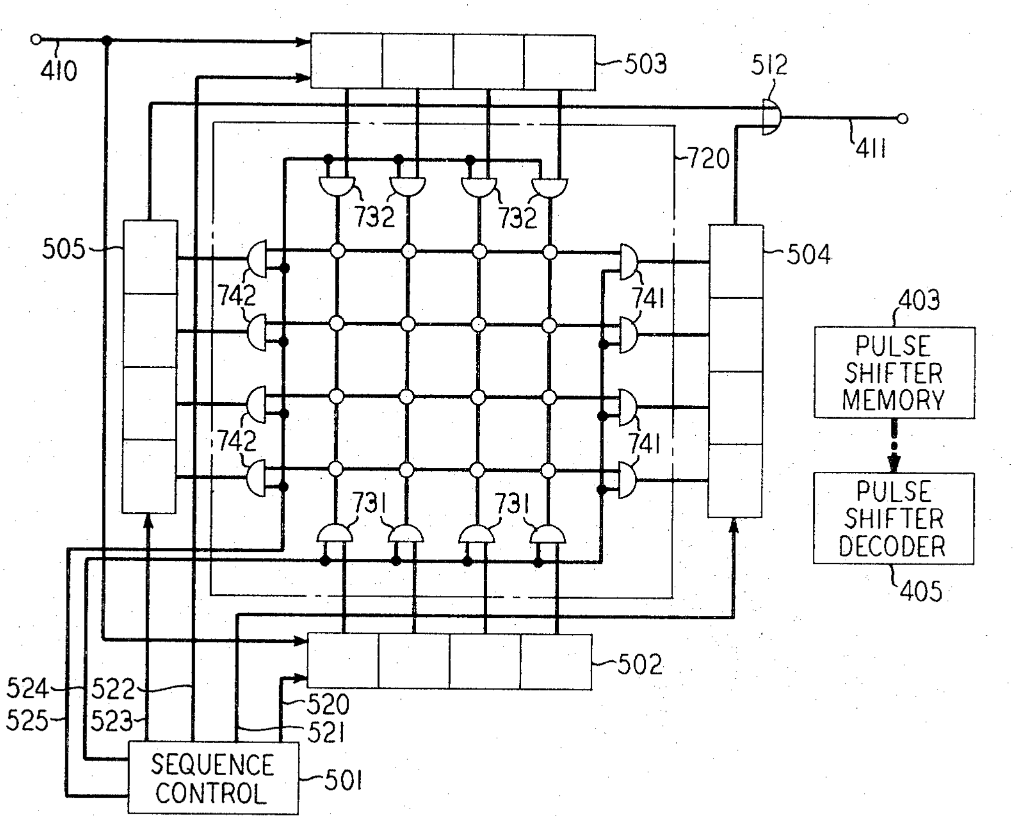
FIG. 7 is a diagram partially in schematic form of a pulse shifter utilizing two pairs of shift registers.

FIG. 7 illustrates another pulse shifter configuration comprising two input registers 502, and 503, two output registers 504 and 505 and a a single gate group 720. In this instance the sequence of signals applied to the network by sequence control 501 on its output leads 520–525 is identical to that depicted in FIG. 6. The signal on output lead 524 is applied to the respective input and output gates 731 and 741. Similarly, the signal on output lead 525 serves to engage the respective input and output gates 732 and 742. Thus gate group 720 accommodates the two sets of input and output registers in the same manner as two gate groups 510 and 511 in the arrangement of FIG. 5 and results in an appreciable reduction in the complexity of the pulse shifter. Such a phase shifter provides a channel availability of *n* to each of 24×*n* channels on the input superhighway.

Figure 8:
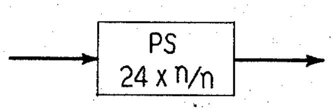
FIG. 8 illustrates the symbol for the pulse shifter of FIG. 7 as it appears in the switching networks depicted in FIGS. 9, 10 and 15.
Figure 9:
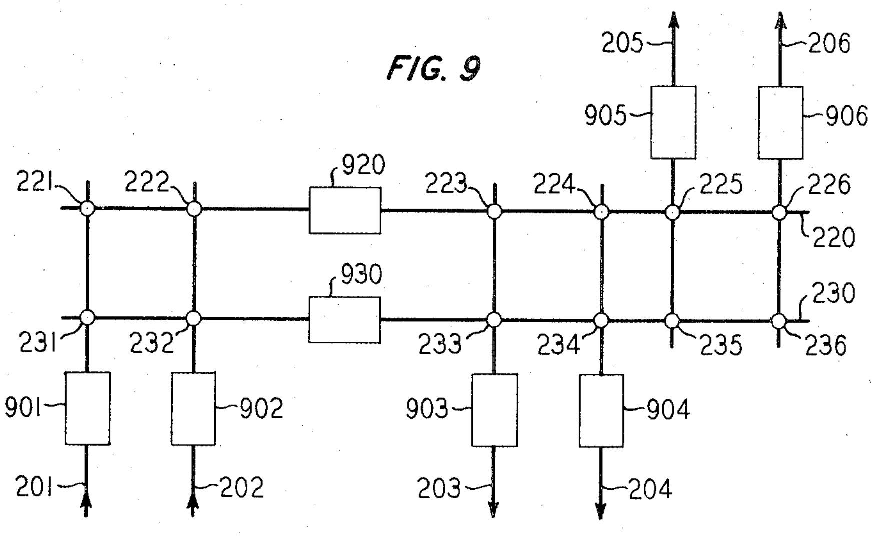
FIG. 9 depicts a three-stage time division switching network employing pulse shifters of the type depicted in FIG. 7.
Figure 15:
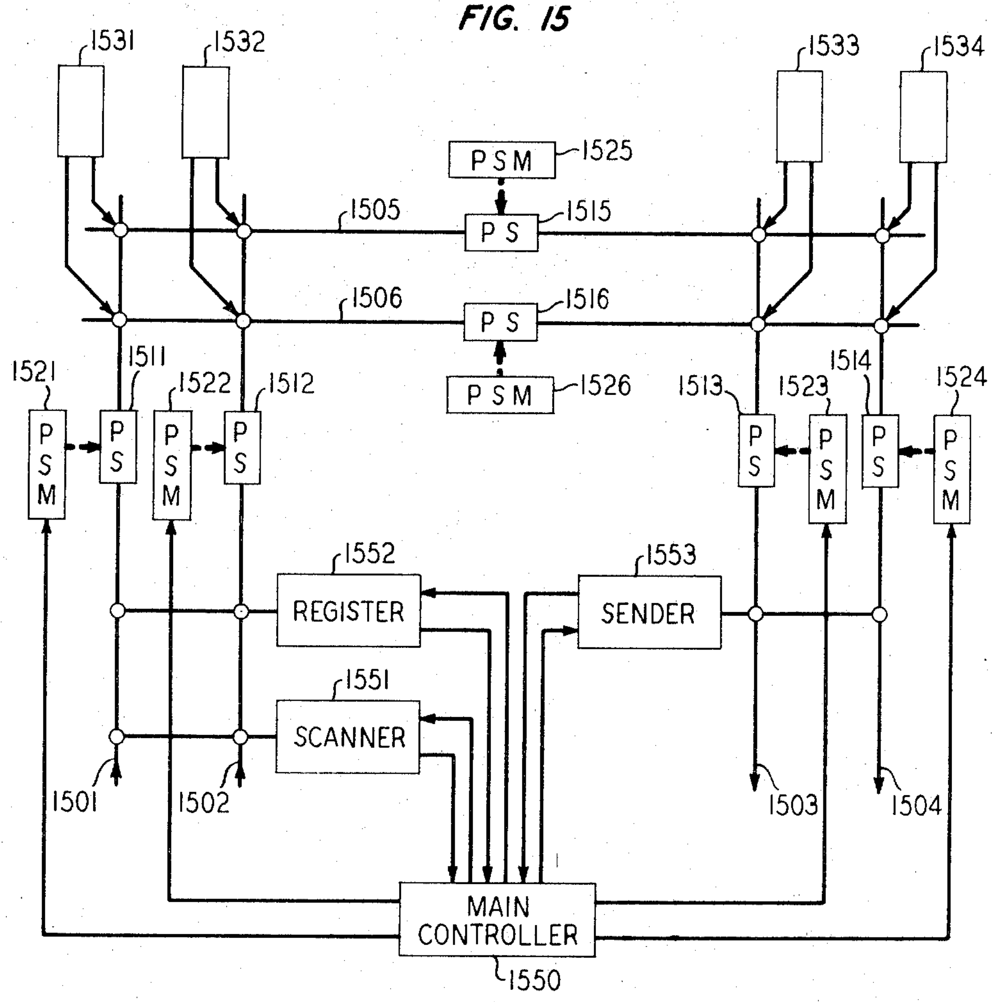
FIG. 15 depicts in simplified block diagram form a complete highway interchange and switching system in accordance with the illustrative embodiment of the invention.

FIG. 8 depicts the symbol for the pulse shifter illustrated in FIG. 7 as utilized in the networks to be described hereinafter with respect to FIGS. 9, 10 and 15. Turning then to FIG. 9, there is depicted a time division switching network employing the type of pulse shifter depicted in FIG. 7. In this network in the incoming, junctor and outgoing paths each comprise a superhighway of interleaved highways. The two incoming superhighways 201 and 202 may be switched selectively at cross-points 221, 222, 231 and 232 so as to transfer incoming information to one of the junctors 220 and 230. Subsequently, the information on the junctors may be switched selectively to one of the two outgoing superhighways 203 and 204 via cross-points 223, 224, 233 and 234, or to one of the pair of outgoing superhighways 205 and 206 via cross-points 225, 226, 235 and 236. These junctors and cross-points, of course, represent a switching network of any desired size to accommodate the member of superhighways present in the system.

The incoming superhighways 201 and 202 are provided with pulse shifters 901 and 902, respectively. Similarly, pulse shifters 920 and 930 are included in the respective junctors 220 and 230, and pulse shifters 903–906 are located in the corresponding outgoing superhighways 203–206. A line number memory is provided for each of the distinct cross-point groups, which memory specifies the desired cross-point to interconnect incoming or outgoing superhighways with the junctors during a specified minibit interval. The configuration of the line number memory may correspond to that described in regard to FIG. 2.

In such a switching network without pulse shifters, as shown in FIG. 2, incoming information must be transitted through one of the junctors, utilizing the same time channel throughout. Thus, if the particular time channel is occupied in all of the junctors or in all of the outgoing highways, the connection cannot be established and the call is blocked. By employing pulse shifters in accordance with our invention, the assigned time channel is fixed throughout the network, but any one of the $\sigma_1$–$\sigma_n$ minibit positions within the fixed time channel may be utilized. Therefore, if one of the minibit positions within an assigned time channel is available between the output of a pulse shifter in the incoming superhighway and the input of a pulse shifter in one of the junctors, the information can be transmitted in the minibit interval corresponding to the input highway. Similarly, in the specified time channel the information can be transmitted to one of the outgoing superhighways if an idle highway, i.e., minibit interval is available in the assigned time channel between the output of the pulse shifter in the junctor and one of the outgoing superhighways.

In this arrangement, therefore, the time channel of a highway carrying information through the network is fixed in every stage of the network, but the highway, as designated by the minibit interval, may be changed in each stage by the pulse shifter in order to permit channel matching through the network. The channel matching procedure may take the following form. It is apparent that among 24×*n* channels in each of the incoming, junctor and outgoing superhighways, *n* channels are available which correspond to one time channel in a highway. The time channel is specified as that assigned to the calling station and appearing on the incoming superhighway. Thus, consider a call assigned to channel 5 on incoming superhighway 201. First, the junctors are examined to assure availability of at least one junctor which has channel 5 idle both between its input and the output of pulse shifter 901 and between its output and the input of the pulse shifter of one of the outgoing superhighways leading to the desired destination. Upon selection of a particular outgoing superhighway, the available junctors are examined to determine if a channel is idle in the input and output of the corresponding pulse shifters. If a junctor is located, the information is transmitted through the network, utilizing the channel of the junctor.

The blocking probability in such an arrangement can be maintained at a level of approximately 0.2 percent, such a figure being determined primarily by the efficiency of each superhighway. Of course the incoming and outgoing superhighways are employed for long-haul transmission so that their cost is relatively high. However, the pulse shifters and junctors employed in accordance with our invention are of relatively lower cost and thus may be of lower efficiency as well.

Figure 10:
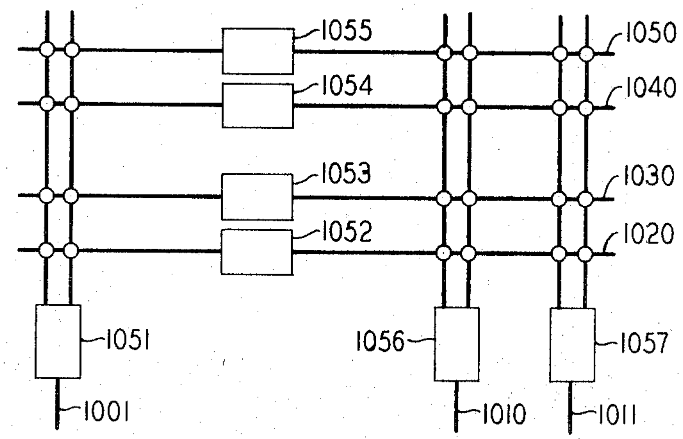
FIG. 10 depicts another three-stage network.

FIG. 10 depicts another embodiment of the invention in which the efficiency of the incoming and outgoing superhighways is high, while the efficiency of the junctors is low. Thus an incoming call arriving on incoming superhighway 1001 has access to one of two outgoing superhighways 1010 and 1011 via one of the junctors 1020, 1030, !040 and 1050. The pulse shifter 1051, in this instance, has one input superhighway and tow output superhighways. Thus the efficiency at the output of pulse shifter 1051 is reduced to one half of that present at the input side. Similarly, pulse shifters 1056 and 1057 in the output superhighways each have two inputs and one output so that the efficiency of the interoffice superhighways is twice that of the junctors.

Figure 11:
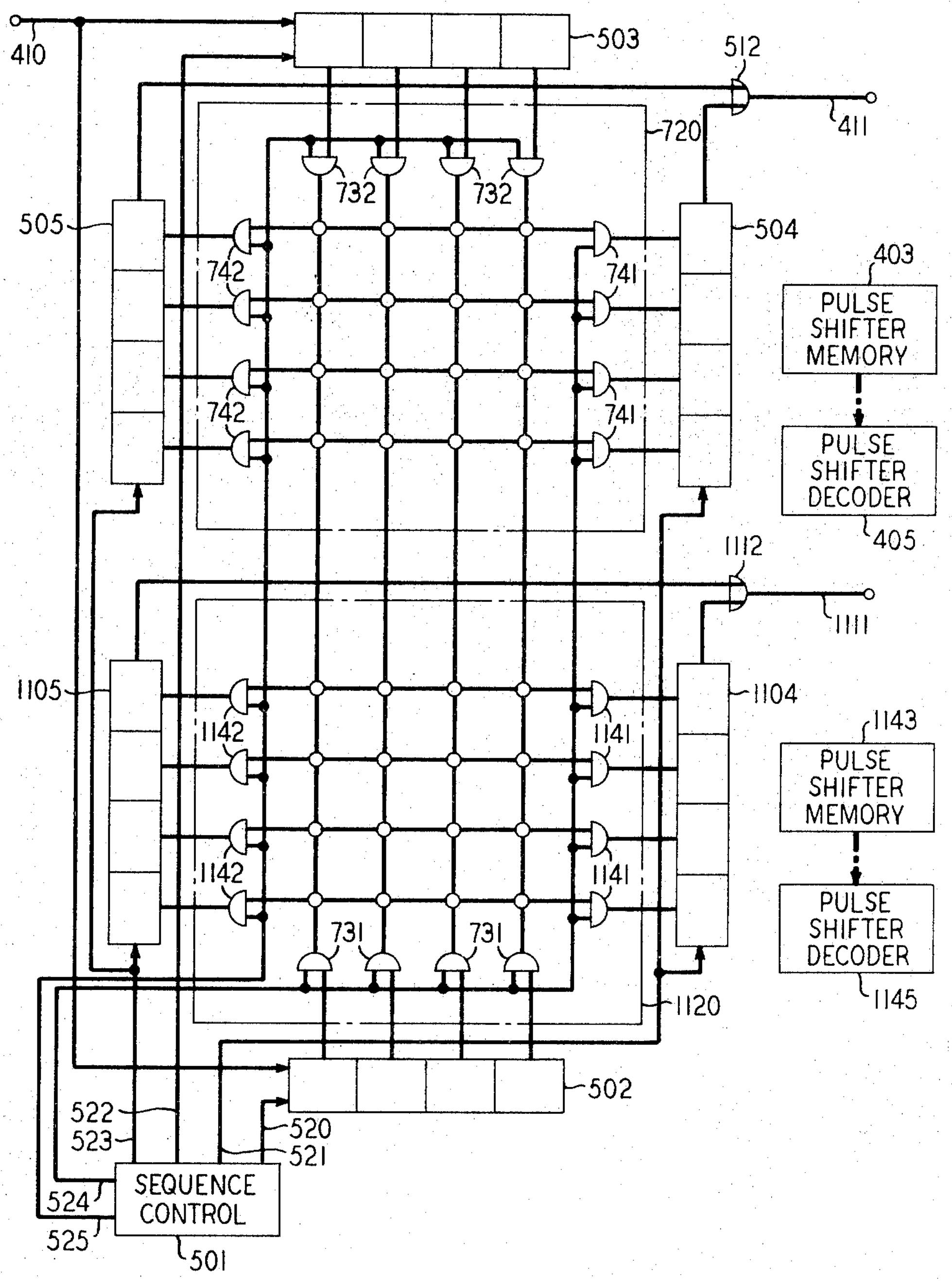
FIGS 11 and 12 depict the types of pulse shifters employed in the input and output paths of the network depicted in FIG. 10, respectively.

FIG. 11 shows the configuration of a pulse shifter having one input superhighway and two output superhighways suitable for use as pulse shifter 1051 in FIG. 10. The input 410 applies information to shift registers 502 and 503, and the output superhighways 411 and 1111 receive information from shift registers 504, 505 and 1104, 1105, respectively, through OR-gates 512 and 1112. The components which are identical to those depicted in FIG. 7 are correspondingly numbered and serve identical functions. Thus registers 502 and 503 receive *n* bits alternately as determined by sequence control 501. These incoming signals are transferred to output registers 504, 505 and 1104, 1105 through the respective gate groups 720 and 1120 under control of decoders 405 and 1145. Registers 504 and 1104 are operated simultaneously in one interval followed by the simultaneous operation of registers 505 and 1105 as determined by sequence control 501.

To switch an input signal to output superhighway 1111, the number of the corresponding minibit is stored in pulse shifter memory 1143 in the position corresponding to the minibit on superhighway 1111. To send a signal to output superhighway 411, similar information is stored in pulse shifter memory 403. Of course the same information is not read out of memories 403 and 1143 simultaneously so that a simultaneous transmission of the same information over both superhighways 411 and 1111 is prevented.

Figure 12:
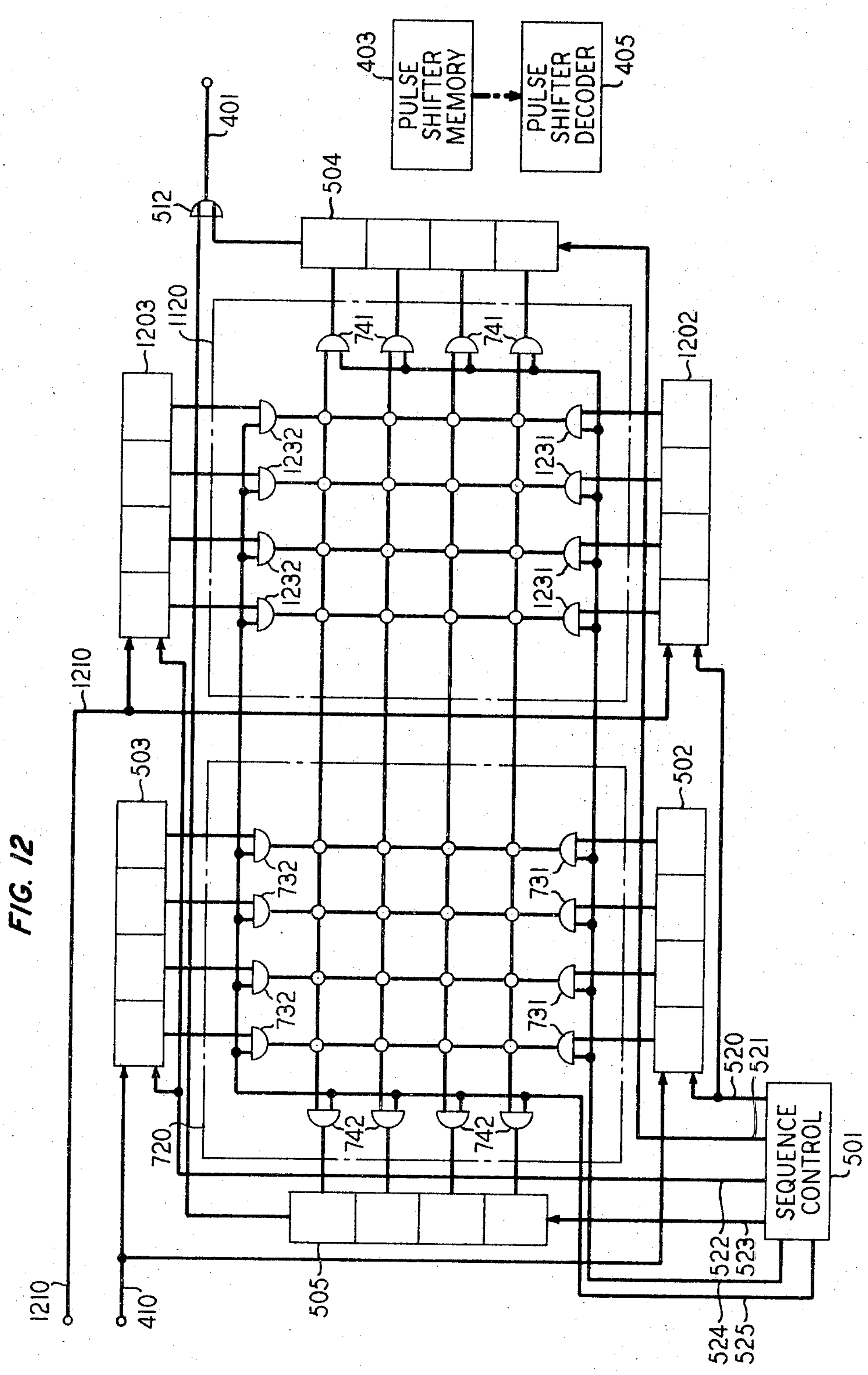

FIG. 12 depicts the pulse shifter having two inputs and one output for use in the output superhighways in the network of FIG. 10. This pulse shifter comprises two pairs of input shift registers 502, 503 and 1202, 1203, which receive input signals from superhighways 410 and 1210, respectively. Input registers 502, 1202 and 503, 1203 operate alternately as directed by sequence control 501. After storing *n* minibits in one of the input registers, sequence control 501 simultaneously enables gates 731 and 1231 via lead 524, or gates 732 and 1232 via lead 525 to transfer each minibit to the selected positions in output registers 504 or 505. Thereafter sequence control 501 enables registers 504 or 505 to transmit their content through OR-gate 512 to output superhighway 401. The timing of this pulse shifter operation is identical to that shown in FIG. 6.

The network operations described in connection with FIGS. 9–12 require that each individual gate be operated rapidly, this leading to a complex gate control scheme. It should be noted, however, that a different gate is operated in each successive minibit interval and that in one time channel of a highway the same sequence of gates is operated in each bit interval. Thus control information relating to a time channel may be transferred from the line number memory to a register and that same information utilized in successive minibit intervals for the full duration of the channel interval.

Figure 13:
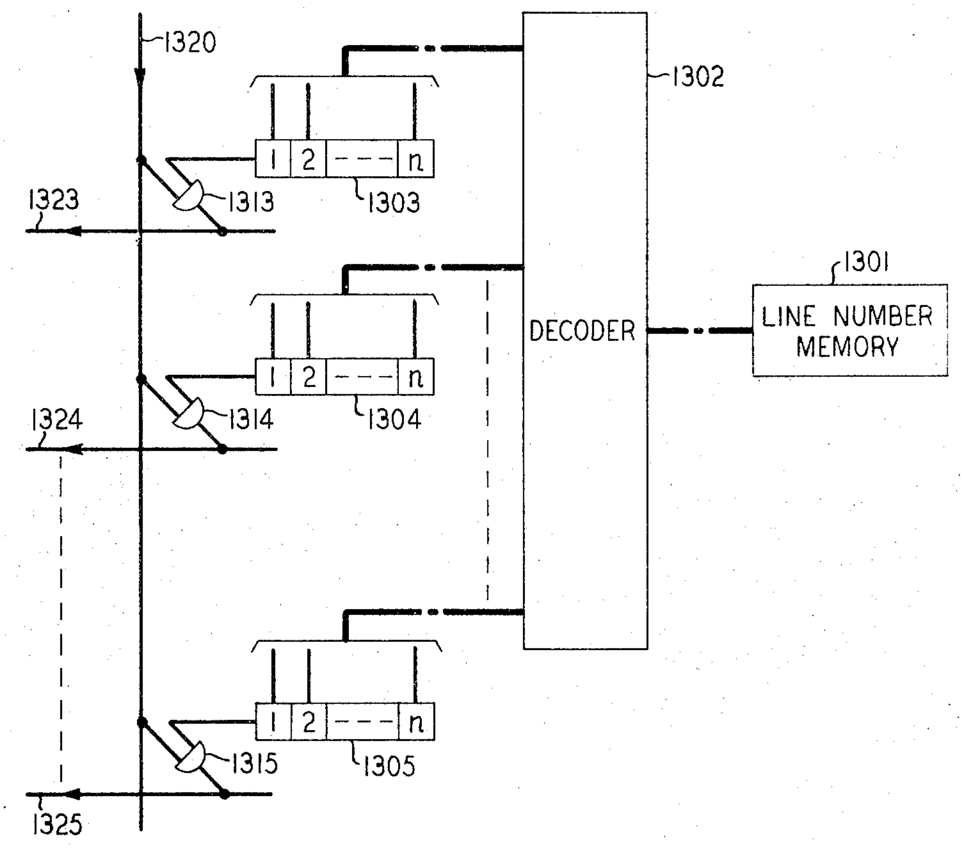
FIG. 13 illustrates a gate control arrangement which may be used in conjunction with the pulse shifter operation.

FIG. 13 depicts one scheme for realizing this gate control operation. Gates 1313–1315 are controlled by recirculating *n* bit registers 1303–1305. If a binary "1" is written in a register, the corresponding gate is energized for the duration of the minibit interval corresponding to the register position containing the binary "1." Thus, upon each appearance of this minibit interval during the prescribed channel interval, the corresponding AND gate will be engaged to transmit the information received on superhighway 1320. A line number memory 1301 is provided for the gate group associated with each incoming, outgoing or junctor superhighway. Decoder 1302 and registers 1303–1305 are provided for each line number memory. Thus the information appearing at input 1320 is transferred selectively to one of the outputs 1323–1325.

Figure 14:
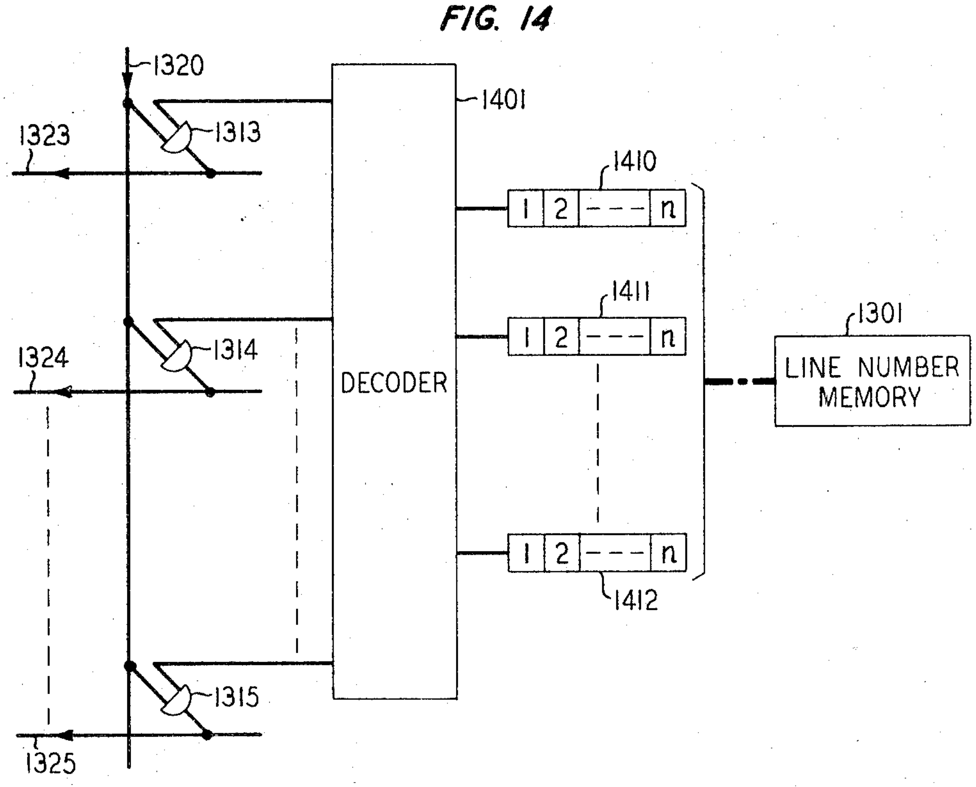
FIG. 14 illustrates an alternative gate control arrangement used in conjunction with the pulse shifter operation.

FIG. 14 depicts another embodiment of the gage control arrangement which decreases the required number of control bits. In this arrangement the output of line number memory 1301 is transferred to registers 1410–1412 prior to decoding in decoder 1401. Since only one of the gates 1313–1315 is energized at a time, the number of the gate to be enabled in each minibit interval is coded in binary form and stored in registers 1410–1412, in parallel. Thus in the time interval corresponding to the first minibit, each bit of the binary code required to enable the corresponding to the first minibit, each bit of the binary code required to enable the corresponding gate is stored in the first stage of the respective registers 1410–1412. Decoder 1401 receives the content of the first stage of each of these registers simultaneously and decodes this information so as to enable the designated one of gates 1313–1315. The remainder of the gates are then enabled in sequence as the bits are shifted through the registers 1410–1412. This embodiment requires less equipment than that depicted in FIG. 13, but the decoding operation must be performed within a minibit interval so that the circuit design is more difficult to implement. For this reason the FIG. 13 arrangement is preferred for very high speed operation.

FIG. 25 is a block diagram of a connecting or tandem office which provides the necessary switching of connections on superhighways between various originating and terminating central offices. The various control components are familiar to the art and are depicted here simply for illustrative purposes. Thus communications arriving as minibits on inputs superhighways 1501 and 1502 are directed selectively through pulse shifters 1511 and 1512 and cross-points in the switching network junctors 1505 and 1506, pulse shifts 1515 and 1516 and finally to output superhighways 1503 and 1504 through the respective pulse shifters 1513 and 1514. Of course the illustrated superhighways and pulse shifters are simply representative of a number of such communication paths which may be provided in such a tandem office. Pulse shifters 1511–1516 advantageously comprise the arrangement depicted in FIG. 5 and are controlled respectively by pulse shifter memories 1521–1526. At the cross-points connecting the junctors with the input and output superhighways, gate control circuits 1531–1534 are provided, each comprising a memory, shift registers and decoder arranged in the manner depicted in FIG. 13 or 14.

When a call connection is completed between originating office and the illustrated tandem office, scanner 1551 having access to each of the incoming superhighways detects the arriving information. Scanner 1551 then alerts main controller 1550 which in turn assigns register 1552 to the time channel in which the information for this call connection arrives. The destination code for this call connection will then be transmitted to register 1552 via the assigned time channel on the input superhighway and register 1552 via the assigned time channel on the input superhighway and register 1552 will report this code to main controller 1550. A path is then selected by controller 1550 which will connect this time channel to an appropriate junctor and output superhighway leading to the desired destination. Having selected this path, controller 1550 writes the proper control information in the various pulse shifter and gate control memories. Simultaneously the destination code is routed to the destination central office via sender 1553 so that similar operations may be performed for switching the call through that office. All of these operations are performed under control of the main controller 1550 in each office in the call connection path.

What is claimed is:

1. In a communication system comprising a plurality of lines divided into distinct groups, a plurality of central offices each associated with certain of said distinct line groups, a distinct transmission highway interconnecting each of said certain distinct line groups with the associated one of said central offices, a plurality of superhighways each interconnecting a pair of said central offices, and means for connecting the active lines in each of said certain distinct line groups to the interconnecting one of said transmission highways in individual recurrent time channels, said central offices each comprising means for multiplexing the information received from the distinct transmission highways interconnected thereto on to said superhighways and means for receiving information from one of said interconnected superhighways in a distinct time channel assigned to one of said interconnecting distinct transmission highways and for transmitting said received information over another one of said superhighways in said distinct time channel assigned to another one of said interconnecting distinct transmission highways.

2. In a communication system comprising a plurality of lines divided into distinct groups, at least first, second and third central offices, a plurality of line group highways each connecting one of said central offices to an associated one of said distinct line groups, a plurality of superhighways each interconnecting a pair of central offices, and means for connecting the active lines in each distinct line group to the associated one of said line group highways in distinct recurrent time channels, at least said first central office comprising means for interleaving the information received from a plurality of said line group highways connected to said first central office for transmission over one of said superhighways interconnected to said first central offices and means for receiving information from a calling line associated with said second central office over one of the superhighways interconnected to said first central office in one time channel assigned to one of said line group highways connected to said first central office and for transmitting said received information to a called line associated with said third central office over another one of said superhighways interconnected to said first central office in said one time channel assigned to another one of said line group highways connected to said first central office.

3. A communication system comprising a plurality of switching centers, a plurality of groups of $n$ highways transmitting information multiplexed in discrete time channels, each switching center terminating one of said groups of $n$ highways, a plurality of superhighways each transmitting information at $n$ times the transmission rate of said highways, each of said superhighways interconnecting a pair of said switching centers, and means in each of said switching centers for interleaving the contents of the group of $n$ highways terminating at said switching center on the superhighway connected to said switching center.

4. A communication system in accordance with claim 3 wherein said discrete time channels are subdivided into a plurality of bit intervals for transmission of each information sample in multiple digit pulse code form, said switching center interleaving means comprising means for interleaving the content of a distinct one of said bit intervals in each of said group of $n$ highways terminating at said switching center for transmission over the superhighway connected to said switching center during said distinct bit interval.

5. A communication system in accordance with claim 3 wherein said switching center interleaving means comprises means for preserving the identical order of interleaving of the content of successive bit intervals for the duration of a time channel.

6. A communication system in accordance with claim 5 wherein said switching center interleaving means comprising means for interchanging the order of interleaving of the interleaved content of a distinct bit interval.

7. A communication system in accordance with claim 6 wherein said order interchanging means comprises incoming register means register receiving interleaved information serially from one of said superhighways, outgoing register means transmitting interleaved information serially to one of said superhighways and gating means for selectively interconnecting the parallel output of said incoming register means with the parallel inputs of said outgoing register means.

8. A communication system in accordance with claim 7 wherein said incoming and outgoing register means each comprises a plurality of shift registers and wherein said order interchanging means further comprises means for enabling said plurality of incoming registers in sequence and means for enabling said outgoing registers in sequence, each of said incoming register being enabled concurrently with a corresponding one of said outgoing registers.

9. A communication system in accordance with claim 6 wherein said switching center comprises a plurality of junctor superhighways and switching means for selectively interconnecting said input and output superhighways via said junctor superhighway, each of said superhighways containing one of said order interchanging means.

10. A communication system in accordance with claim 9 wherein each of said order interchanging means in said input superhighways comprises one input and a plurality of outputs, each of said order interchanging means in said junctor superhighways comprises one input and one output and each of said order interchanging means in said output superhighways comprises a plurality of inputs and one output.

11. A time division communication system comprising a plurality of switching centers, a plurality of groups of transmission highways, each switching center terminating at least one of said groups of transmission highways, each of said highways accommodating a plurality of messages transmitted concurrently in serial time multiplex form characterized in that a plurality of superhighways interconnect said plurality of switching centers in pairs, and means in each of said switching centers serially interleave the content of said highways being terminated thereon and apply the resultant interleaved content to one of said superhighways interconnected to said switching center.

12. A time division communication system in accordance with claim 11 wherein each of said plurality of messages is sampled, coded and transmitted over one of said transmission highways in a discrete time channel of a repetitive cycle of time channels, each channel accommodating a coded sample in a sequence of bit intervals, characterized in that each of said switching centers comprises means for serially interleaving the content of corresponding bit intervals in each of said highways terminating thereon for transmission over one of said superhighways connected thereto during said bit interval.

13. A time division communication system in accordance with claim 12, characterized in that each of said switching centers comprises delay means for reordering the serially interleaved content of each of said bit intervals and means for switching the reordered interleaved content from one superhighway to another superhighway.

14. In a time division multiplex switching system, a switching center terminating first paths each transporting a repetitive sequence of message samples from originating terminals, each sample having a different destination reached through said switching center, and second paths each transporting a repetitive sequence of message samples from said switching center toward the respective destination terminals, said center comprising a plurality of junctor paths, switching means for selectively interconnecting said first and second paths via said junctor paths and means for predetermining the position of each of said message samples in the succeeding path of said first, junctor and second paths to obviate message blocking comprising means in each of said first, junctor and second paths for shifting the relative positions of said message samples in the transmitted sequence prior to switching the samples to the succeeding path of said first, junctor and second paths.

* * * * *

UNITED STATES PATENT OFFICE

CERTIFICATE OF CORRECTION

Patent No. 3,632,884 Dated January 4, 1972

Inventor(s) Hiroshi Inose and Tadao Saito

It is certified that error appears in the above-identified patent and that said Letters Patent are hereby corrected as shown below:

Column 1, line 47, after "time." delete "Such operations will always be sampled at the proper time."; line 70, "scaling" should read --calling--. Column 2, line 9, "h." should read --H.--; line 74, "FIG. 1" should read --FIG. 1A--. Column 3, line 60, before "the time"' insert --24--. Column 5, line 26, after "maintained", "of" should read --for--. Column 6, line 13, "$2_n$" should read --$2^n$--; line 60, "engage" should read --enable--; line 65, "Such a phase" should read --Such a pulse--; line 73, after "network" delete "in". Column 7, line 10, "member" should read --number--. Column 8, line 5, "tow" should read --two--; line 54, "this" should read --thus--; line 69, "engaged" should read --enabled--. Column 9, line 1, "gage" should read --gate--; line 10, after "corresponding" delete "to the first minibit, each bit of the binary code required to enable the corresponding"; line 23, "FIG. 25" should read --FIG. 15--; line 28, "inputs" should read --input--; line 31, "shifts" should read --shifters--; line 52, after "1552" delete "via the assigned time channel on the input superhighway and register 1552". Column 10, line 61, "comprising" should read --comprises--; line 66, after "means" delete "register"; line 70, "output" should read --outputs--.

Signed and sealed this 12th day of September 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE 1969 O—366-334